April 8, 1969     D. W. MOLINS     3,437,189
APPARATUS FOR HANDLING ROD-SHAPED ARTICLES
Filed June 6, 1967
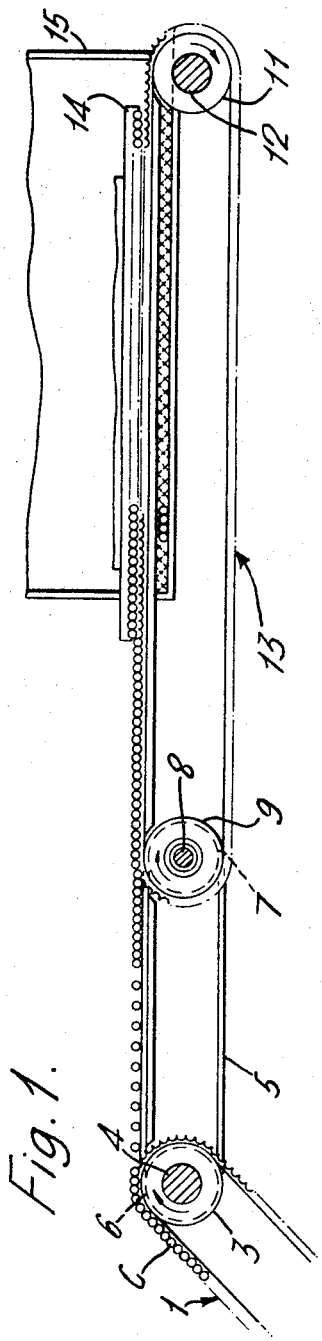
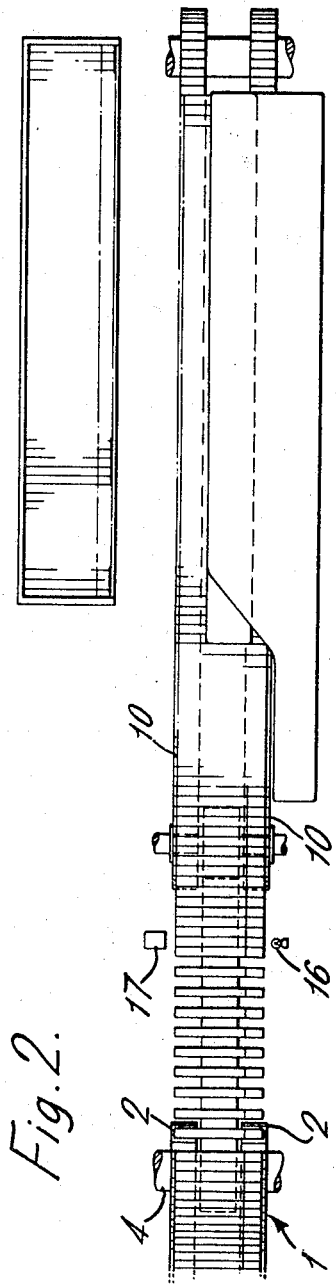

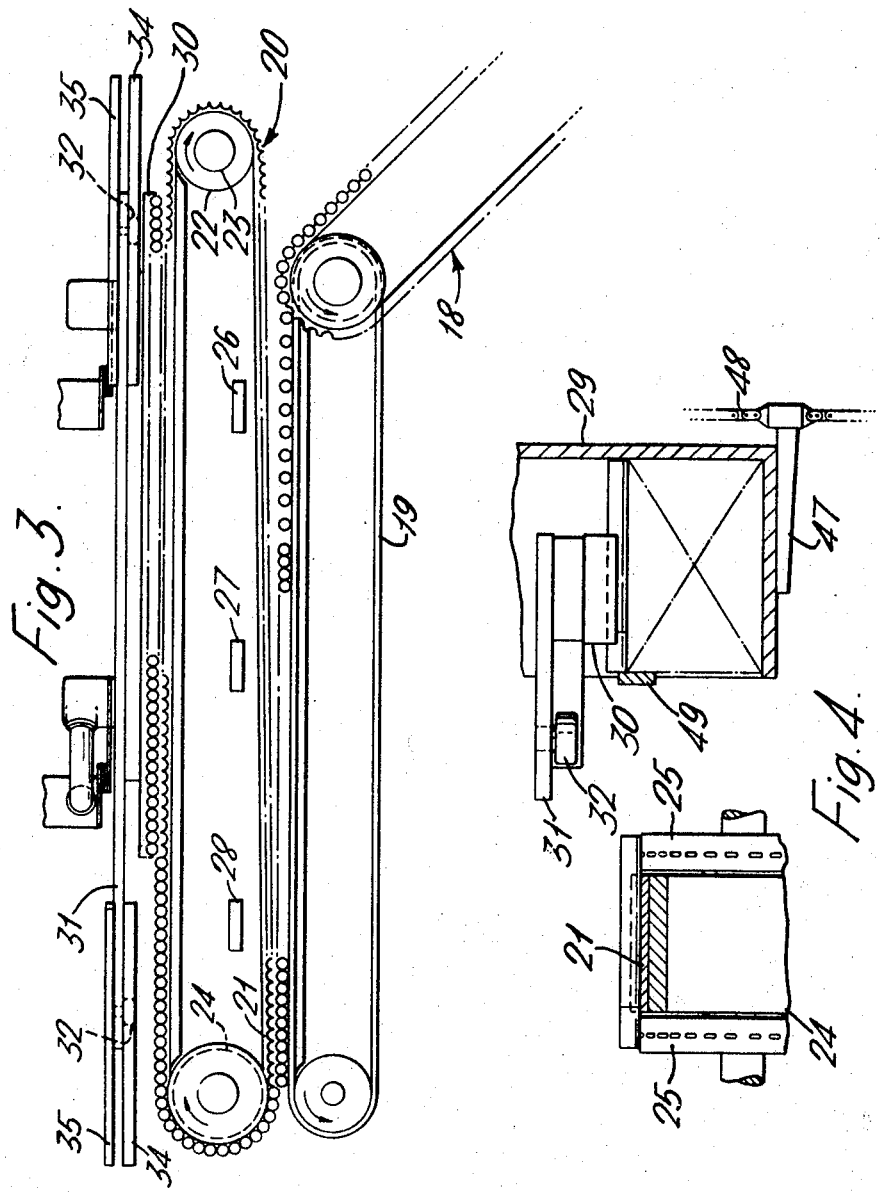

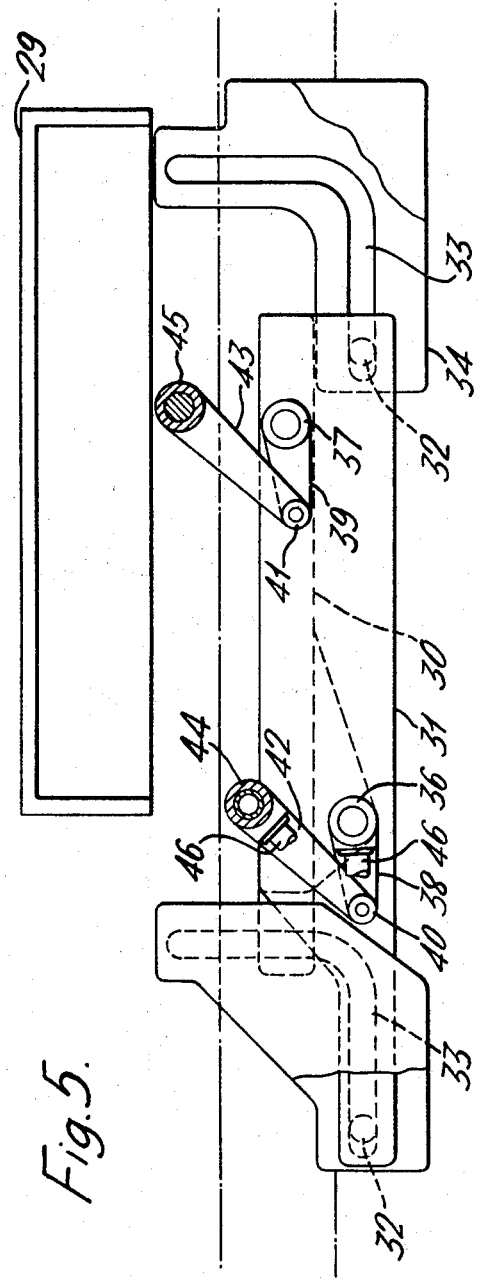
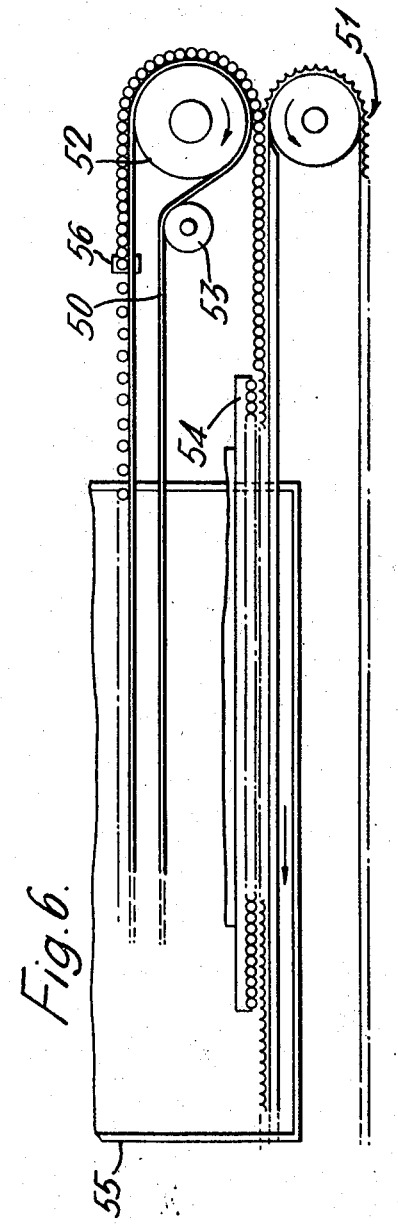

United States Patent Office 3,437,189
Patented Apr. 8, 1969

3,437,189
APPARATUS FOR HANDLING ROD-SHAPED ARTICLES
Desmond Walter Molins, Deptford, London, England, assignor to Molins Machine Company Limited, London, England, a corporation of Great Britain
Filed June 6, 1967, Ser. No. 643,916
Claims priority, application Great Britain, June 15, 1966, 26,709/66
Int. Cl. B65g 47/31, 47/42
U.S. Cl. 198—22          12 Claims

ABSTRACT OF THE DISCLOSURE

Cigarette-collecting apparatus wherein cigarettes are fed sideways as a row from a supply conveyor via a faster smooth-surfaced conveyor to a fluted conveyor whose speed is controlled responsively to detection of the number of contiguous cigarettes at the downstream end of the smooth-surfaced conveyor to ensure that every flute is filled despite fluctuations in supply. An overhead fluted suction bar moves with and at the same speed as the fluted conveyor to engage a batch of cigarettes and then moves transversely to remove the batch from the conveyor.

---

This invention concerns improvements in or relating to apparatus for handling rod-shaped articles, such as cigarettes.

Various devices have been proposed or used whereby cigarettes issuing from a cigarette-making machine are delivered to a collecting station at which, for example, they may be deposited in receptacles, often known as "trays." The present invention provides a means whereby successive batches of articles may be collected at a collecting station, and provides a means for controlling the number of articles contained in each such batch, despite fluctuations in the supply. These batches may be collected from a continuous supply and deposited in succession in a receptacle, each batch consisting of a row of articles.

Although in the embodiment about to be described, the articles dealt with are cigarettes, it will be understood that other rod-shaped articles, such as cigars or filter rods, could be similarly dealt with.

According to the present invention there is provided apparatus for collecting successive batches of rod-shaped articles, such as cigarettes, comprising conveyor means to receive articles and convey them in a direction transverse to their longitudinal axes as a row, transfer means operative in timed relationship with the conveyor means to remove therefrom a predetermined number of articles (e.g. to deposit them in a receptacle), detector means to detect deficiencies in the rate at which articles are fed towards the conveyor means, and control means actuated by said detector means to control the speed of the conveyor means to ensure that a full complement of articles is within the range of action of the transfer means whenever the latter operates.

For example the conveyor means may comprise a pocketed conveyor having transverse flutes or pockets each adapted to receive and hold an article, and the apparatus may include supply means arranged to maintain a supply of articles close to the pocketed conveyor so that each flute or pocket receives an article, the detector means acting to detect reductions in the number of articles in said supply so that the speed of the pocketed conveyor will be reduced until the supply is restored to a predetermined number of articles. The supply means may include a smooth-surfaced conveyor band, arranged to move at a speed always at least as great as or in excess of that of the pocketed conveyor, so as to maintain a group of contiguous articles close to the pocketed conveyor, the conveyor band being able to slip beneath the said group so that contiguous articles can only move at the speed of the pocketed conveyor, and the detector means may comprise means, e.g. a photoelectric device, to detect gaps between articles on that part of the conveyor band which it is desired should be occupied by a group of contiguous articles. In the event of a gap being detected, the speed of the pocketed conveyor is reduced until the gap is closed.

As the transfer means operates in timed relationship with the pocketed conveyor, it will only operate when the correct group of flutes or pockets is within its range of action, and hence by ensuring that each flute or pocket receives an article, it is possible to ensure that a full complement of articles is removed and transferred each time.

The articles may be fed to the said conveyor band by a supply conveyor arranged to feed articles in contiguous succession and to move at a speed equal to the normal (i.e. the highest) speed of the pocketed conveyor. Thus if the smooth-surfaced conveyor band has a higher speed the articles will become spaced out on it and will close up again when their speed is reduced by contact with articles close to the pocketed conveyor.

The invention also provides a transfer device for transferring successive batches of articles from a moving conveyor, e.g. into a receptacle located alongside the conveyor. According to this aspect of the invention there is provided conveyor means arranged to convey rod-shaped articles (e.g. cigarettes) in a direction transverse to their longitudinal axes, the articles being arranged in a row, and a transfer device comprising a transfer member arranged to move with the conveyor means at substantially the speed of the conveyor means and to engage a batch of articles while so moving, and then to move in a direction transverse to the direction of movement of the conveyor means so as to remove the said batch from the conveyor means.

Preferably the transfer member is located above the level of the conveyor means and has suction ports on its undersurface, whereby each batch of articles can be lifted from the conveyor means and laid in an adjacent receptacle.

The transfer member may have cam-following rollers arranged to run in a pair of cam tracks, each having a straight portion extending along the direction of movement of the conveyor means a sufficient distance to enable the transfer member to accelerate to the speed of the conveyor means before engaging articles carried thereon.

Apparatus in accordance with the invention will now be described by way of example with reference to the accompanying drawings in which:

FIGURE 1 is a side elevation of cigarette collecting apparatus,

FIGURE 2 is a plan view of the apparatus shown in FIGURE 1,

FIGURE 3 is a side elevation of another embodiment of cigarette collecting apparatus, FIGURE 4 is an end elevation, partly in section, of part of the apparatus shown in FIGURE 3, drawn to a larger scale, FIGURE 5 is a plan view of a transfer device in the apparatus shown in FIGURE 3, and shown in a different position from that in FIGURE 3, and FIGURE 6 is a side elevation of a further embodiment of cigarette collecting mechanism.

Referring to FIGURES 1 and 2, the apparatus shown therein comprises a supply conveyor, generally indicated by the reference 1, formed by two endless spaced bands 2 provided with transverse flutes in which cigarettes C are carried and fed transversely of their axes in contiguous succession. The bands 2 pass round rollers 3 mounted on a driven shaft 4 rotating clockwise as viewed in FIGURE 1. A smooth-surfaced endless conveyor band 5 passes round a roller 6 coaxial with the shaft 4 and positioned between the rollers 3 carrying the bands 2, a suitable bearing being provided for the roller 6 to enable the band 5 to travel at a speed greater than that of the bands 2. The conveyor band 5 also travels round a roller 7 mounted on a driven shaft 8, rotating clockwise as viewed in FIGURE 1.

Coaxial with the shaft 8, and positioned on either side of the roller 7, are two rollers 9 having suitable bearings to enable them to rotate at a speed different from that of the shaft 8 and roller 7. Two endless, spaced conveyor bands 10 travel round the rollers 9 and round rollers 11 mounted on a driven shaft 12 rotating clockwise as viewed in FIGURE 1. The bands 10 are each provided with transverse flutes or pockets, and the two bands together provide a pocketed conveyor (generally indicated by the reference 13) having transverse flutes or pockets each adapted to receive and hold a cigarette, so that the conveyor can receive and convey cigarettes transversely of their axes as a row.

Above the conveyor 13 there is provided transfer means including a bar 14, having flutes to which suction is applied in its undersurface which operates in timed relationship with the conveyor 13 and moves, in a manner more fully described later, with and at substantially the same speed as the conveyor 13 as its receives a batch of cigarettes in a row from the conveyor 13 (the cigarettes being transferred from the flutes of conveyor 13 to the flutes of bar 14), and then moves transversely to the direction of movement of conveyor 13 to deposit the batch of cigarettes, as a row, in a receptacle, i.e. a tray 15. The tray 15 is lowered, in a known manner, after each batch of cigarettes is received in it so that the next batch can be deposited in the tray on top of the preceding batch.

The supply conveyor 1 moves at a constant speed and thus, when it carries a full complement of cigarettes, i.e. when every flute on the conveyor 1 is occupied by a cigarette, feeds the cigarettes at a constant rate. The speed of the pocketed conveyor 13 is variable and can be reduced from a maximum which matches the speed of the conveyor 1, i.e. at which cigarettes are conveyed by the conveyor 13 at the same rate as they are fed by the conveyor 1 when the latter carries a full complement of cigarettes. The conveyor band 5 travels at a constant speed higher than that of the conveyor 1 and therefore always in excess of that of the pocketed conveyor 13. This higher speed of the band 5 causes the cigarettes received thereon from the supply conveyor 1 to become spaced apart on the upstream part of the band 5, but at its downstream end, where the cigarettes are transferred to the slower moving pocketed conveyor 13, the cigarettes are decelerated by engagement one with another and prevented from moving at a speed greater than that of the pocketed conveyor 13, the smooth surface of the band 5 slipping beneath the cigarettes on the band. In this manner a group of contiguous cigarettes forms on the downstream part of the band 5.

In "normal" operation, i.e. when the supply conveyor 1 is feeding a full complement of cigarettes, the speed of the conveyor 13 is at its maximum and matches the speed of the conveyor 1 so that an equilibrium is set up and the group of contiguous cigarettes on the downstream part of conveyor band 5 contains a predetermined number of cigarettes and extends a substantially predetermined distance back from the upstream end of pocketed conveyor 13. However, fluctuations may occur in the rate of supply of cigarettes by the supply conveyor 1, in that some of the flutes on the conveyor 1 may be empty. For example, the supply conveyor 1 may convey cigarettes away from an inspecting and rejection device which inspects the cigarettes in succession and rejects any cigarettes which are found to be faulty, so that the flute on conveyor 1 which corresponds to a cigarette which has been rejected will be empty. When the rate of supply of cigarettes by the conveyor 1 is thus reduced thhere will be a greater gap than usual between two successive cigarettes carried on the band 5 and the group of contiguous cigarettes on the downstream part of the band 5 will extend less than the staid predetermined distance back from the upstream end of pocketed conveyor 13, since it will contain less than the said predetermined number of cigarettes.

To detect such a reduction in the rate of supply of cigarettes, detector means comprising a light source 16 and photoelectric cell 17 (see FIGURE 2) are arranged on opposite sides of the path of the cigarettes on the band 5 at a position approximately the said predetermined distance from the upstream end of pocketed conveyor 13. When the group of contiguous cigarettes on the downstream part of band 5 extends back less than the said predetermined distance, the gap between successive cigarettes will be detected by the detector means (since there will be no obstruction between the source 16 and cell 17). The photo-electric cell is arranged to actuate control means (not shown) which control the speed of the pocketed conveyor 13 (by controlling the speed of rotation of its drivign shaft 12), and when a gap is detected in the manner explained above the detector means actuates the control means to reduce the speed of the conveyor 13. Such reduction of speed of the conveyor 13 continues until the group of contiguous cigarettes on the downstream part of band 5 builds back to an extent such that it again contains the said predetermined number of cigarettes and extends back the said predetermined distance, when the cell 17 again becomes obstructed from the source 16, and the control means is thereby caused to restore the speed of pocketed conveyor 13 to its maximum.

It will thus be seen that there is maintained a supply of cigarettes (i.e. the group of contiguous cigarettes on the downstream part of band 5) close to the pocketed conveyor 13, thus ensuring that a full complement of cigarettes is fed to the conveyor 13, i.e. that a cigarette is fed into every flute on the conveyor 13.

The bar 14 operates in timed relationship with the conveyor 13 to pick up a row containing a predetermined number of cigarettes (the downstream flute in bar 14 registering with the leading cigarette on conveyor 13 at the time of pick-up) and to transfer them into the adjacent tray 15. The control means which controls the speed of the conveyor 13 correspondingly controls the movement of the bar 14 to maintain the timed operational relationship between the two. Thus, the arrangement described, by ensuring that a cigarette is fed into every flute on the conveyor 13, ensures that a full complement of cigarettes is within the range of action of the bar 14 whenever the latter operates to transfer a batch of cigarettes from the conveyor 13 to the tray 15, and therefore ensures that there is the same number of cigarettes contained in each such batch, despite fluctuations in the rate of supply of cigarettes by the supply conveyor 1.

The operation of the embodiment shown in FIGURES 3, 4 and 5 is generally similar to that of the embodiment shown in FIGURES 1 and 2, but the disposition of the conveyors and the speed controls on the pocketed conveyor are different.

Referring to FIGURE 3, the apparatus includes a fluted supply conveyor 18 (similar to the supply conveyor 1 of FIGURE 1), which moves at a constant speed, and delivers cigarettes to a faster, constant speed, smooth-surfaced conveyor band 19 (similar to the conveyor bands of FIGURE 1).

Above the conveyor band 19 is a pocketed conveyor 20, whose operation is similar to that of the pocketed conveyor 13 of FIGURE 1, but which consists of a single endless conveyor band 21 (see FIGURE 4) provided with transverse flutes or pockets each adapted to receive and hold a cigarette. The band passes round a roller 22 mounted on a driven shaft 23, rotating clockwise as viewed in FIGURE 3, and round a roller 24 which is of larger diameter than the roller 22 so that the lower rim of the band 21 slopes slightly to converge towards the horizontal upper run of the band 19. Connected to, and arranged one on either side of the roller 24 are two discs 25 having peripheral ports or slots through which suction is applied. The cigarettes carried on the band 19 are transferred into the flutes of the band 21 by the action of suction through these discs 25 and are suctionally held in the flutes as they travel upwardly round the roller 24.

The pocketed conveyor 20 can travel at two speeds, the faster of which matches the speed of the supply conveyor 18, i.e. when travelling at this faster speed the conveyor 20 feeds cigarettes at the same rate as the conveyor 18 when the latter is feeding a full complement of cigarettes. The smooth-surfaced conveyor band 19, in travelling at a faster speed, causes the cigarettes to become spaced apart at its upstream portion and then to move into contact with each other towards its downstream end so that a group of contiguous cigarettes extends upstream from the point of transfer to the slower moving pocketed conveyor 20, the smooth surface of the band 19 slipping beneath the contiguous cigarettes (in the same way as the conveyor band 5 of FIGURE 1).

Above the lower run of the pocketed conveyor 20 are three spaced photoelectric devices 26, 27 and 28, each comprising a light source and photoelectric cell and positioned so as to be capable of detecting, by reflection of light from the cigarettes, whether there are gaps between the cigarettes passing beneath on the band 19, or whether the cigarettes are in contiguous succession. The photoelectric devices actuate control means (not shown) which control the movement of the pocketed conveyor 20 in the following manner.

When the center photoelectric device 27 detects gaps between the cigarettes passing beneath it, i.e. when the group of contiguous cigarettes on the band 19 extends back from the point of transfer to conveyor 20 a distance less than the distance of the photoelectric device 27 from that point, the photoelectric device 27 actuates the control means to reduce the speed of the conveyor 20 (by reducing the speed of its driving shaft 23) to the lower of its two speeds. The conveyor 20 then continues at its lower speed until the upstream photoelectric device 26 detects that the cigarettes beneath it are in contiguous succession, i.e. that the group of contiguous cigarettes on the band 19 extends back from the point of transfer to the conveyor 20 as far as the photoelectric device 26, and the photoelectric device 26 then actuates the control means to increase the speed of the conveyor 20 to the faster of its two speeds. Thus, when the rate of supply of cigarettes by the supply conveyor 18 falls (because of empty flutes on that conveyor) to an extent such that the group of contiguous cigarettes on the downstream part of band 19 does not extend back from the point of to the conveyor 20 as far as the photoelectric device 27, the speed of the conveyor 20 is automatically reduced.

If the rate of supply of cigarettes by the supply conveyor 18 is so low that, despite the reduction in speed of the conveyor 20, the number of contiguous cigarettes in the group on the downstream portion of conveyor band 19 continues to fall, then when the downstream photoelectric device 28 detects a gap between the cigarettes passing beneath it (i.e. when the group of contiguous cigarettes does not extend back from the point of transfer to conveyor 20 as far as the photoelectric device 28), the photoelectric device 28 actuates the control means to completely stop the conveyor 20. The conveyor 20 then remains stationary until the photoelectric device 28 detects that the cigarettes beneath it are contiguous, when the control means is actuated to restart the conveyor 20 at the lower of its two speeds.

This arrangement thus ensures that there is always a group of contiguous cigarettes on the downstream part of the band 19, and thus that a cigarette can be transferred to every flute of the pocketed conveyor 20 so that the latter always carries a full complement of cigarettes.

In the embodiment shown in FIGURES 3, 4 and 5, the conveyor 20 has two speeds and three photoelectric detector devices are provided. It will be appreciated, however, that if desired the conveyor 20 may be arranged to have more than two speeds and a corresponding greater number of detector devices may be provided.

Still referring to FIGURES 3, 4 and 5, above the upper horizontal run of the pocketed conveyor band 20, there is transfer means which operates in timed relationship with the conveyor 20 to transfer successive batches of cigarettes therefrom into an adjacent tray 29 (FIGURES 4 and 5). The transfer means include a bar 30 (similar to the bar 14 of FIGURE 1) having transverse flutes each adapted to receive one cigarette and to which suction is applied. The bar 30 is mounted on a member 31 carrying cam following rollers 32 which engage and travel in a pair of cam tracks 33 in stationary plates 34 located above the bar 30. The cam tracks 33 each have a straight portion extending along the direction of movement of the pocketed conveyor 20 a sufficient distance to enable the bar 30 to accelerate (by means described later) to the speed of the conveyor 20 before engaging cigarettes carried therein, and a further portion normal to the said straight portion whereby the bar 30 can be moved transversely to the direction of movement of the conveyor 20. Further stationary plates 35 are positioned above the plates 34, the member 31 being positioned between the two sets of plates 34 and 35.

Connected to the top of the member 31 by pivots 36 and 37 respectively are links 38 and 39 which are connected respectively by pivots 40 and 41 to further links 42 and 43, thus forming a pair of crank arms. The links 42 and 43 are respectively mounted on shafts 44 and 45 which are driven to move the member 31 and hence the bar 30. The shaft 44 is hollow and communicates through a flexible pipe 46 with the pivot 36, which is also hollow and which connects with a chamber in the member 31. This chamber communicates with suction ports in the flutes of the bar 30, and suction is applied to the flutes by the application of suction to the hollow shaft 44.

The shafts 44 and 45 are oscillated in timed relationship with the movement of the pocketed conveyor 20 so that the member 31, and hence the bar 30, is moved by the crank linkages, and under the control of the cam following rollers 32 running in the tracks 33, as follows. The bar 30 is accelerated as the cam following rollers 32 travel along the straight portion of the tracks 33 extending along the direction of movement of the conveyor 20 until its speed is the same as that of the conveyor 20, at which time the leading flute of the bar 30 registers with, i.e. is directly above, the leading cigarette on the conveyor 20. The bar 30 then picks up a batch of cigarettes as a row containing a predetermined number of cigarettes (i.e. the number of flutes in the bar 30) by the application of suction (through the hollow shaft 44) to the flutes in the bar 30, and the bar 30 then moves transversely to the direction of movement of the conveyor 20 (as the cam following rollers 32 travel along the portion of the tracks 33 normal to the said straight portion) until it reaches the position shown in FIGURE 4 at which suction is cut off from the flutes in the bar and the row of cigarettes is deposited in the tray 29. The bar 30 is then returned to its initial position and accelerated to pick up the next batch of cigarettes in the same manner. In this way successive batches of cigarettes, each consisting of a row containing the said predetermined number of cigarettes, are transferred from the conveyor 20 into the tray 29. The tray 29 is carried on a support platform 47 mounted on a chain 48 (FIGURE 4) and the chain 48 is moved downwardly after each batch of cigarettes is received in the tray to lower the tray a distance corresponding to one row of cigarettes, so that the next batch of cigarettes can be deposited in the tray on top of the preceding batch.

The transfer means and the chair 48 operate in timed relationship with the movement of the conveyor 20 and are subject to control by the control means. Thus when the speed of the conveyor 20 is altered by the control means (through actuation by one of the photoelectric devices 26 and 27) the rate of operation of the transfer means and the chain 48 is correspondingly altered. Similarly, if the photoelectric device 28 actuates the control means to stop the conveyor 20, the operation of the transfer means and the chain 48 is also stopped.

The transfer means described above in the embodiment shown in FIGURES 3, 4 and 5 is also used in the embodiment of FIGURE 1 described previously.

If desired, the bar 30 may be arranged to move downwardly slightly onto the cigarettes on conveyor 20 as it picks them up, and then to move upwardly to raise the cigarettes from the conveyor. It may also be arranged to move downwardly slightly as it deposits the cigarettes in the tray and upwardly again after they have been deposited. The transfer means may be provided with a small bar 49 (FIGURE 4) adapted, in known manner, to tap the ends of the cigarettes when they are deposited in the tray to ensure that the end faces of the cigarettes in the tray are aligned.

FIGURE 6 shows a further embodiment of cigarette collecting mechanism whose operation is generally similar to that of the embodiments already described but in which the disposition of the conveyors is different. In the embodiment of FIGURE 6 there is a smooth-surfaced conveyor band 50, which corresponds to the band 5 of FIGURE 1 and the band 19 of FIGURE 3, but which is positioned above a pocketed conveyor band 51, which corresponds to the pocketed conveyor 13 of FIGURE 1 and the pocketed conveyor 20 of FIGURE 3. The band 50 passes round a roller 52 having end portions, similar to the discs 25 connected to the roller 24 of FIGURE 4, through which suction is applied so that the cigarettes can be held on the band by suction as they travel round the roller. The band 50 also passes round an idler roller 53 positioned to hold the lower run of the band clear from the upper run of the pocketed conveyor 51 from which the cigarettes are transferred by transfer means including a fluted suction bar 54 (corresponding to the bar 14 of FIGURE 1 and the bar 30 of FIGURE 3) into an adjacent tray 55 in a manner as described in relation to the other embodiments. The band 50 travels at a constant speed greater than that of a supply conveyor (not shown) from which it receives cigarettes and the speed of the pocketed conveyor 51 can vary from a maximum which matches the speed of the supply conveyor. Suitable detector devices, one of which is shown at 56, are provided to detect when the group of contiguous cigarettes on the downstream (right-hand as viewed in FIGURE 6) portion of the upper run of the band 50 contains less than a predetermined number of cigarettes, and thereupon to actuate control means to reduce the speed of the pocketed conveyor 51, whereby it can be ensured that a full complement of cigarettes is fed to the pocketed conveyor 51 as explained in relation to the previously described embodiment.

What I claim as my invention and desire to secure by Letters Patent is:

1. Apparatus for collecting successive batches of rod-shaped articles, comprising a smooth surfaced conveyor band to feed articles, a pocketed conveyor to receive said articles and convey them in a direction transverse to their longitudinal axes as a row, transfer means operative in timed relationship with the pocketed conveyor to remove therefrom a predetermined number of articles, detector means to detect deficiencies in the rate at which articles are fed towards the pocketed conveyor and effective to control the speed of the pocketed conveyor to ensure that a full complement of articles is within the range of action of the transfer means whenever the latter operates, and means to move the said smooth surfaced conveyor band at a speed always at least as great as that of the pocketed conveyor, so as to maintain a supply of contiguous articles close to the pocketed conveyor, said conveyor band being able to slip beneath said supply so that the contiguous articles can only move with the speed of the pocketed conveyor.

2. Apparatus as claimed in claim 1 wherein said detector means is effective to detect gaps between articles on that part of the conveyor band which it is desired should be occupied by a supply of contiguous articles.

3. Apparatus as claimed in claim 2 wherein said detector means includes a photoelectric device.

4. Apparatus as claimed in claim 1 comprising a supply conveyor arranged to feed articles in contiguous succession, to said conveyor band, and means to move said supply conveyor at a speed equal to the highest speed of the pocketed conveyor.

5. Apparatus for collecting successive batches of rod-shaped articles, comprising conveyor means to receive articles and convey them in a direction transverse to their longitudinal axes as a row, a transfer member operative in timed relationship with the conveyor means to remove therefrom a predetermined number of articles, detector means to detect deficiencies in the rate at which articles are fed by said feeding means towards the conveyor means and effective to control the speed of the conveyor means to ensure that a full complement of articles is within the range of action of the transfer member whenever the latter operates, and means mounting said transfer member above the level of the conveyor means arranged to move said transfer member with the said conveyor means at substantially the speed of the conveyor means so that the member can engage a batch of articles while so moving, and then to move said transfer member in a direction transverse to the direction of movement of the conveyor means so that the member can remove said batch from the conveyor means, said transfer member having suction ports in its undersurface connected to a source of suction so that each batch of articles can be lifted from the conveyor means.

6. Apparatus as claimed in claim 5 wherein said transfer member has flutes in its undersurface, each flute being adapted to accommodate one article.

7. Apparatus for collecting successive batches of rod-shaped articles, comprising conveyor means arranged to convey articles in a direction transverse to their longitudinal axes as a row, and a transfer device comprising a transfer member, and means to accelerate said transfer member to substantially the speed of the conveyor means and in the same direction as the direction of travel of the conveyor means so that the member can engage a batch of articles while so moving, and then to move said transfer member in a direction transverse to the direction of movement of the conveyor means so that the member can remove said batch from the conveyor means.

8. Apparatus as claimed in claim 7 comprising means mounting said transfer member above the level of the conveyor means and wherein said transfer member has suction ports in its undersurface connected to a source of suction so that each batch of articles can be lifted from the conveyor means.

9. Apparatus as claimed in claim 8 wherein said transfer member has flutes in its undersurface, each flute being adapted to accommodate one article.

10. Apparatus as claimed in claim 7 comprising cam-following rollers mounted on said transfer member, and a cam member having a pair of cam tracks in which said rollers can run, each of said cam tracks having a straight portion extending along the direction of movement of the conveyor means a sufficient distance to enable the transfer member to accelerate to the speed of the conveyor means before engaging articles carried thereon.

11. Apparatus for collecting successive batches of rod-shaped articles, comprising conveyor means arranged to convey articles in a direction transverse to their longitudinal axes as a row, and a transfer device comprising a suction transfer member positioned above the level of the conveyor means, and means to move the transfer member along the conveyor means in the direction and at the speed thereof for engaging a batch of articles on the conveyor, and thereafter to move the transfer member at right angles to the path of travel of the conveyor means to transfer the batch of articles away from the conveyor means.

12. Apparatus for collecting successive batches of rod-shaped articles, comprising means for feeding articles, conveyor means to receive articles from said feeding means and convey them in a direction transverse to their longitudinal axes as a row, a transfer member operative in timed relationship with the conveyor means to remove therefrom a predetermined number of articles, detector means to detect deficiencies in the rate at which articles are fed by said feeding means towards the conveyor means and effective to control the speed of the conveyor means to ensure that a full complement of articles is within the range of action of the transfer member whenever the latter operates, and means to move said transfer member with the said conveyor means at substantially the speed of the conveyor means so that the member can engage a batch of articles while so moving, and then to move said transfer member in a direction transverse to the direction of movement of the conveyor means so that the member can remove said batch from the conveyor means, said means to move the transfer member including cam following rollers mounted on said transfer member and a cam member having a pair of cam tracks in which said rollers can run, each of said cam tracks having a straight portion extending along the direction of movement of the conveyor means a sufficient distance to enable the transfer member to accelerate to the speed of the conveyor means before engaging articles carried thereon.

References Cited

UNITED STATES PATENTS

| | | |
|---|---|---|
| 1,815,372 | 7/1931 | Frazier. |
| 2,822,910 | 2/1958 | Wachsmuth _____ 198—24 |
| 3,070,207 | 12/1962 | Molins et al. _____ 198—35 |
| 3,155,221 | 11/1964 | Griner _____ 198—76 XR |
| 3,190,459 | 6/1965 | Kochalski et al. ____ 198—20 XR |
| 3,225,891 | 12/1965 | Hickin et al. _____ 214—1 |
| 2,977,731 | 4/1961 | Brook _____ 53—59 X |

EDWARD A. SROKA, *Primary Examiner.*

U.S. Cl. X.R.

198—31, 76